US010018501B2

(12) United States Patent
Furukawa

(10) Patent No.: US 10,018,501 B2
(45) Date of Patent: Jul. 10, 2018

(54) MEASURING APPARATUS FOR MEASURING VIBRATION OR DISPLACEMENT AND METHOD FOR MEASURING VIBRATION OR DISPLACEMENT

(71) Applicant: Yokogawa Electric Corporation, Tokyo (JP)

(72) Inventor: Osamu Furukawa, Tokyo (JP)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 0 days.

(21) Appl. No.: 15/447,681

(22) Filed: Mar. 2, 2017

(65) Prior Publication Data
US 2017/0254697 A1    Sep. 7, 2017

(30) Foreign Application Priority Data

Mar. 4, 2016  (JP) .................................. 2016-042761
Jul. 27, 2016  (JP) .................................. 2016-147538

(51) Int. Cl.
G01D 5/32       (2006.01)
G01H 9/00       (2006.01)
G01D 5/353      (2006.01)

(52) U.S. Cl.
CPC ........... *G01H 9/00* (2013.01); *G01D 5/35306* (2013.01)

(58) Field of Classification Search
CPC .. G01H 9/00; G01H 1/00; G01H 3/00; G01D 5/35306
USPC ............................ 73/655, 649, 653, 652, 570
See application file for complete search history.

(56) References Cited

U.S. PATENT DOCUMENTS

| 3,733,129 | A | * | 5/1973 | Bridges | .................. | G01S 17/325 |
| | | | | | | 356/5.09 |
| 5,748,295 | A | * | 5/1998 | Farmer | .................. | G01S 17/325 |
| | | | | | | 356/28.5 |
| 6,175,416 | B1 | * | 1/2001 | Maris | .................. | G01N 21/1702 |
| | | | | | | 356/432 |

(Continued)

FOREIGN PATENT DOCUMENTS

| GB | 1076991 A | 7/1967 |
| JP | 5494803 B2 | 5/2014 |

OTHER PUBLICATIONS

Oliver Gerberding; "Deep frequency modulation interferometry", Optics Express, vol. 23, No. 11, May 27, 2015(May 27, 2015), p. 14753 (10 pages total).*

(Continued)

*Primary Examiner* — Manish S Shah
*Assistant Examiner* — Nigel Plumb
(74) *Attorney, Agent, or Firm* — Sughrue Mion, PLLC

(57) ABSTRACT

A measuring apparatus for contactlessly measuring vibration or displacement of a measurement target includes a light source configured to emit a continuous wave of light frequency-modulated to arrange a measurement site of the measurement target within a correlation peak, a divider configured to divide the continuous wave of light into first and second divided-waves of light, a light receiver configured to receive interfering light of the first divided-wave of light reflected by the measurement target and the second divided-wave of light, and a calculator configured to calculate the vibration or displacement of the measurement target using an electric signal output from the light receiver.

18 Claims, 10 Drawing Sheets

(56) References Cited

U.S. PATENT DOCUMENTS

| | | | |
|---|---|---|---|
| 6,455,214 B1* | 9/2002 | Wakamoto | G03F 7/70358 430/22 |
| 6,583,853 B1* | 6/2003 | Magome | G03F 7/70025 355/53 |
| 7,233,402 B2* | 6/2007 | Vilhelmsson | G01N 21/21 356/519 |
| 8,760,665 B2* | 6/2014 | Ume | G01N 21/1702 356/502 |
| 2001/0049589 A1* | 12/2001 | Yasuda | G03F 9/7003 702/150 |
| 2013/0056883 A1* | 3/2013 | Furukawa | H01L 23/16 257/782 |
| 2013/0340527 A1 | 12/2013 | Konishi et al. | |

OTHER PUBLICATIONS

Oliver Gerberding; "Deep frequency modulation interferometry", Optics Express, vol. 23, No. 11, May 27, 2015(May 27, 2015), p. 14753 (10 pages total).

Siegmund, "Sources of Measurement Error in Laser Doppler Vibrometers and Proposal for Unified Specifications," Proc. of SPIE, 2008, vol. 7098.

* cited by examiner

MEASURING APPARATUS FOR MEASURING VIBRATION OR DISPLACEMENT AND METHOD FOR MEASURING VIBRATION OR DISPLACEMENT

BACKGROUND OF THE INVENTION

Field of the Invention

The present invention relates to a measuring apparatus for measuring vibration or displacement of a measurement target and a method for measuring vibration or displacement of the measurement target.

Priority is claimed on Japanese Patent Application No. 2016-042761, filed on Mar. 4, 2016 and Japanese Patent Application No. 2016-147538, filed on Jul. 27, 2016, the contents of which are incorporated herein by reference.

Description of Related Art

A measuring apparatus for measuring vibration or displacement has been used to measure vibration or displacement of a measurement target in a variety of fields. For example, the measuring apparatus has been used to measure vibration or displacement of various devices provided in a plant (for example, a valve device such as a flow control valve or open/close valve, a rotating device such as a fan or motor, a pipe, and other devices), or various engines (such as, for example, engines for automobiles, aircraft, ships, and or others).

Such a measuring apparatus for measuring vibration or displacement is classified roughly into a contact measuring apparatus and a non-contact measuring apparatus. The contact measuring apparatus includes a piezoelectric or capacitance semiconductor acceleration sensor as a representative example, and the non-contact measuring apparatus includes a Laser Doppler Velocimeter, Velocimetry, or Vibrometer (hereinafter, referred to as "LDV"), which uses a laser interferometer, as a representative example.

The piezoelectric semiconductor acceleration sensor, which is a kind of contact measuring apparatus, is small, does not require an external power source, and does not require definition of displacement reference point. Since the piezoelectric semiconductor acceleration sensor does not have static sensitivity, a zero-shift due to a direct current component is not occurred in the piezoelectric semiconductor acceleration sensor. On the other hand, the LDV, which is a kind of non-contact measuring apparatus, can perform remote measurement, does not influence the weight of measurement target, and has wide measuring dynamic range. Japanese Patent No. 5494803 (hereinafter, referred to as "Patent Document 1") discloses an example of the above-mentioned piezoelectric semiconductor acceleration sensor. G. Siegmund, "Sources of Measurement Error in Laser Doppler Vibrometers and Proposal for Unified Specifications", Proc. SPIE, 7098, 70980Y, discloses an example of the above-mentioned LDV.

In order to measure the vibration or displacement of the measurement target using the above-mentioned piezoelectric semiconductor acceleration sensor, it is required to bring the piezoelectric semiconductor acceleration sensor into contact with the measurement target, in other words, to attach the piezoelectric semiconductor acceleration sensor to the measurement target. Since the weight of the measurement target is increased by the weight of the piezoelectric semiconductor acceleration sensor attached, there are some cases in which the resonance frequency of the vibration of the measurement target is changed. Since, in an acceleration sensor having a configuration in which a weight is supported by a beam as disclosed in the Patent Document 1, the maximum displacement amount of the weight is restricted, the measuring dynamic range is limited.

On the other hand, in the above-mentioned LDV, the resonance frequency is not changed and the dynamic range is not limited unlike in the case of the piezoelectric semiconductor acceleration sensor. The measuring accuracy of the LDV is higher than the piezoelectric semiconductor acceleration sensor. However, since the LDV requires to ensure a spatial optical path of laser (usually, straight optical path), the LDV cannot measure, for example, the inside of a measurement target which cannot be directly seen from the LDV.

In both of the above-mentioned piezoelectric semiconductor acceleration sensor and the LDV, errors due to integration are occurred. That is, when calculating the displacement using the piezoelectric semiconductor acceleration sensor, it is necessary to integrate two times detection results (detection results indicating acceleration). When calculating the displacement using the LDV, it is necessary to integrate one time detection results (detection results indicating velocity). In both cases, when integrating the detection results, errors are occurred. If the displacement of the measurement target can be directly measured without using integral calculation, which may cause such degradation of measured results, it is considered that measurement with high accuracy can be achieved.

The non-contact measuring apparatus other than the LDV includes a laser interferometer which performs sweeping of optical path difference using an optical modulator. Such a laser interferometer can perform displacement measurement with high accuracy and high speed, but the optical modulator provided in the laser interferometer is more expensive than passive optical components or semiconductor electronic components.

SUMMARY OF THE INVENTION

An aspect of the present invention provides a measuring apparatus for measuring vibration or displacement and a method for measuring vibration or displacement which have a wide dynamic range, and can perform measurement with higher accuracy than ever before.

A measuring apparatus for contactlessly measuring vibration or displacement of a measurement target according to one aspect of the present invention may include a light source configured to emit a continuous wave of light frequency-modulated to arrange a measurement site of the measurement target within a correlation peak, a divider configured to divide the continuous wave of light into first and second divided-waves of light, a light receiver configured to receive interfering light of the first divided-wave of light reflected by the measurement target and the second divided-wave of light, and a calculator configured to calculate the vibration or displacement of the measurement target using an electric signal output from the light receiver.

In the above-mentioned measuring apparatus, the light source may have a modulation period and a modulation amplitude set to arrange the measurement site of the measurement target within the correlation peak.

In the above-mentioned measuring apparatus, the modulation period and the modulation amplitude of the light source may be set to arrange the measurement site of the measurement target at a former or a latter of the correlation peak.

In the above-mentioned measuring apparatus, the modulation period of the light source may be set to an integral multiple of a value obtained by dividing a difference between a first length of a first optical path and a second length of a second optical path by a light speed or is set to a value close to the integral multiple. The first optical path leads the first divided-wave of light divided by the divider to the measurement target and leads the first divided-wave of light reflected by the measurement target to the light receiver, and the second optical path leads the second divided-wave of light divided by the divider to the light receiver.

In the above-mentioned measuring apparatus, the modulation amplitude of the light source may be set in accordance with a size of the vibration or displacement of the measurement site of the measurement target.

The above-mentioned measuring apparatus may further include an optical fiber configured to lead the first divided-wave of light divided by the divider to an irradiation position for emitting the first divided-wave of light to the measurement target.

The above-mentioned measuring apparatus may further include a lens arranged between the irradiation position and the measurement target, the lens being configured to focus the first divided-wave of light emitted from the optical fiber on the measurement site of the measurement target.

The above-mentioned measuring apparatus may further include a lens arranged between the irradiation position and the measurement target, the lens being configured to collimate the first divided-wave of light emitted from the optical fiber and to irradiate the measurement site of the measurement target with the collimated light.

The above-mentioned measuring apparatus may further include a controller configured to control the light source while referring calculation results of the calculator.

In the above-mentioned measuring apparatus, the correlation peak may appear when an optical path difference between the first divided-wave of light and the second divided-wave of light is equal to zero or a value obtained by dividing the optical path difference by a light speed is an integral multiple of modulation period of the continuous wave of light.

A method for contactlessly measuring vibration or displacement of a measurement target according to another aspect of the present invention may include emitting a continuous wave of light frequency-modulated to arrange a measurement site of the measurement target within a correlation peak, dividing the continuous wave of light into first and second divided-waves of light, receiving interfering light of the first divided-wave of light reflected by the measurement target and the second divided-wave of light to generate an electric signal, and calculating the vibration or displacement of the measurement target using the electric signal.

The above-mentioned method may further include, before emitting the continuous wave of light, irradiating a reflection mirror arranged at a reference position in an optical path of the first divided-wave of light and calculating a modulation frequency of the continuous wave of light to maximize the electric signal, irradiating the measurement target with the first divided-wave of light under a condition in which the reflection mirror is removed from the reference position and measuring intensity of the electric signal while changing the modulation frequency of the continuous wave of light, and determining the modulation frequency of the continuous wave of light to arrange the measurement site of the measurement target within the correlation peak.

In the above-mentioned method, a modulation period and a modulation amplitude may be set to arrange the measurement site of the measurement target within the correlation peak.

In the above-mentioned method, the modulation period and the modulation amplitude may be set to arrange the measurement site of the measurement target at a former or a latter of the correlation peak.

In the above-mentioned method, the modulation period may be set to an integral multiple of a value obtained by dividing a difference between a first length of a first optical path and a second length of a second optical path by a light speed or is set to a value close to the integral multiple. The first optical path leads the first divided-wave of light to the measurement target and leads the first divided-wave of light reflected by the measurement target to a light receiving position, and the second optical path leads the second divided-wave of light to the light receiving position.

In the above-mentioned method, the modulation amplitude may be set in accordance with a size of the vibration or displacement of the measurement site of the measurement target.

In the above-mentioned method, the first divided-wave of light may be led to an irradiation position for emitting the first divided-wave of light to the measurement target by an optical fiber.

In the above-mentioned method, the first divided-wave of light emitted from the optical fiber may be focused on the measurement site of the measurement target by a lens arranged between the irradiation position and the measurement target.

In the above-mentioned method, the first divided-wave of light emitted from the optical fiber may be collimated by a lens arranged between the irradiation position and the measurement target and the measurement site of the measurement target is irradiated with the collimated light.

In the above-mentioned method, the correlation peak may appear when an optical path difference between the first divided-wave of light and the second divided-wave of light is equal to zero or a value obtained by dividing the optical path difference by a light speed is an integral multiple of modulation period of the continuous wave of light.

According to one aspect of the present invention, the continuous wave of light output from the light source is frequency-modulated so that the measurement site of the measurement target is arranged in the correlation peak, the continuous wave of light is divided into first and second divided-waves of light, the interfering light of the first divided-wave of light reflected by the measurement target and the second divided-wave of light is received, and the vibration or displacement of the measurement target are calculated using the electric signal based on the interfering light. Since a dynamic range is not restricted unlike in the case of a prior acceleration sensor and integral calculation is not required, a wide dynamic range is achieved and a measurement with higher accuracy than the prior art can be performed.

DETAILED DESCRIPTION OF THE INVENTION

Hereinafter, some embodiments of a measuring apparatus for measuring vibration or displacement of the present invention will be described with reference to the drawings.

First Embodiment

<Configuration of Measuring Apparatus for Measuring Vibration or Displacement>

Figure 1:
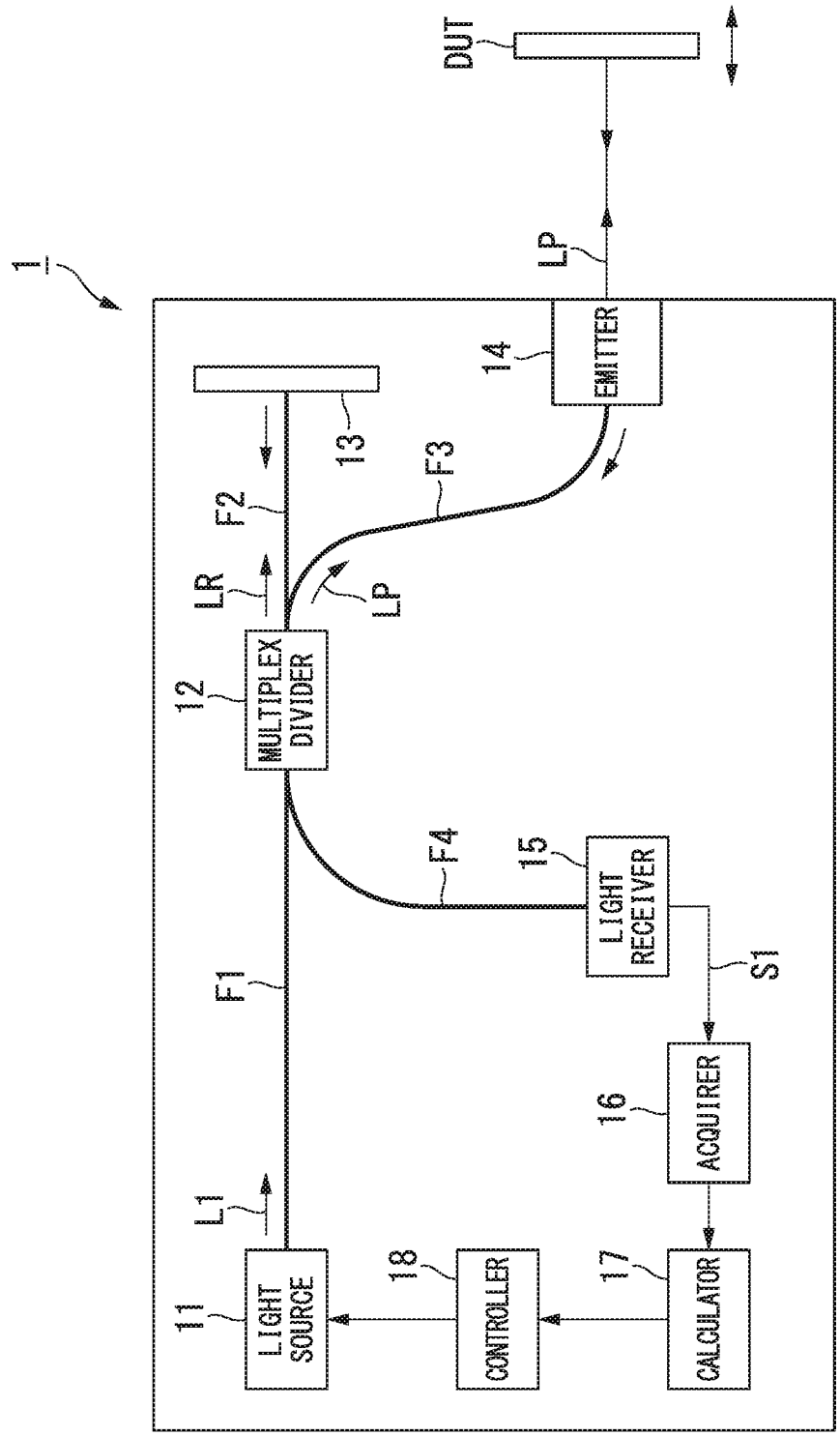
FIG. 1 is a block diagram showing main components of a measuring apparatus for measuring vibration or displacement according to a first embodiment of the present invention.

FIG. 1 is a block diagram showing main components of a measuring apparatus for measuring vibration or displacement according to a first embodiment of the present invention. As shown in FIG. 1, a measuring apparatus 1 for measuring vibration or displacement according to the present embodiment includes, for example, a light source 11, a multiplex divider (divider) 12, a reflector 13, an emitter 14, a light receiver 15, an acquirer 16, a calculator 17, a controller 18, and polarization maintaining optical fibers F1 to F4. The measuring apparatus 1 irradiates a measurement target DUT with probe light LP (a first divided-wave of light) and contactlessly measures the vibration or displacement of the measurement target DUT. The measurement target DUT includes, for example, various devices provided in a plant, various engines, and the like, but is not especially limited and may be arbitrary.

The light source 11 includes a semiconductor laser element, for example, a Distributed Feed-Back Laser Diode (DFB-LD). The light source 11 is controlled by the controller 18 and outputs continuous wave of light L1, which is frequency-modulated and linearly polarized wave. The continuous wave of light L1 output from the light source 11 is frequency-modulated so that the measurement site of the measurement target DUT (the site to be irradiated with the probe light LP) is arranged in a correlation peak. The details will be described later. The polarization maintaining optical fiber F1 is connected to the output of the light source 11. The continuous wave of light L1 output from the light source 11 is led to the multiplex divider 12 via the polarization maintaining optical fiber F1.

Not shown in the figure, in the light source 11, an isolator for stabilizing the operation of the semiconductor laser element is provided at the emission end of the semiconductor laser element. The continuous wave of light L1 emitted from the semiconductor laser element is emitted to the outside of the light source 11 via the isolator, but the returned light to the semiconductor laser element (for example, the reflected light of the continuous wave of light L1) is blocked by the isolator. Since the returned light to the semiconductor laser element is blocked by the isolator, the operation of the semiconductor laser element is stabilized.

The multiplex divider 12 has four input-output ends, to which the polarization maintaining optical fibers F1 to F4 are connected, respectively, and multiplexes or divides the light input from these input-output ends. For example, an optical coupler or optical circulator may be used as the multiplex divider 12. In particular, the multiplex divider 12 divides the light (a continuous wave of light L1) input from the input-output end, to which the polarization maintaining optical fiber F1 is connected, into reference light LR (a second divided-wave of light) and probe light LP while maintaining the polarization state. The multiplex divider 12 outputs the divided reference light LR from the input-output end, to which the polarization maintaining optical fiber F2 is connected, and outputs the divided probe light LP from the input-output end, to which the polarization maintaining optical fiber F3 is connected. The division ratio of the multiplex divider 12 may be arbitrarily set. For example, the division ratio is set so that the division ratio of the reference light LR to the probe light LP is 1:1.

The multiplex divider 12 multiplexes wave of light (the reflected light of the reference light LR) input from the input-output end to which the polarization maintaining optical fiber F2 is connected and wave of light (the reflected light of the probe light LP) input from the input-output end to which the polarization maintaining optical fiber F3 is connected while maintaining the polarization states, and outputs the multiplexed light from the input-output end to which the polarization maintaining optical fiber F4 is connected. The light multiplexed by the multiplex divider 12 may be output from only the input-output end to which the polarization maintaining optical fiber F4 is connected, and may not be output from the input-output end to which the polarization maintaining optical fiber F1 is connected.

The reflector 13 is arranged at the end of the polarization maintaining optical fiber F2 (or, in the vicinity of the end). The reflector 13 reflects the reference light LR led by the polarization maintaining optical fiber F2 while maintaining the polarization state of the reference light LR. The reflected light of the reference light LR is entered into the polarization maintaining optical fiber F2, and is led to the multiplex divider 12 via the polarization maintaining optical fiber F2. The emitter 14 emits the probe light LP led by the polarization maintaining optical fiber F3 to the outside of the measuring apparatus 1 while maintaining the polarization state of the probe light LP. The probe light LP emitted from the emitter 14 may be focused on the measurement site of the measurement target DUT, or may be collimated. The reflected light of the probe light LP, which is reflected by the measurement target DUT, is entered into the emitter 14.

The light receiver 15 includes a light receiving element, for example, a photodiode, an avalanche photodiode, or the like. The light receiver 15 receives the light led by the polarization maintaining optical fiber F4 (the multiplexed light of the reflected light of the reference light LR and the reflected light of the probe light LP). Since the light led to the light receiver 15 by the polarization maintaining optical fiber F4 is light where the reference light LR and the probe light LP interfere with each other, the light receiver 15 outputs an electric signal S1 indicating the interference intensity of the reference light LR and the probe light LP.

The acquirer 16 converts the electric signal S1 output from the light receiver 15 to a signal, which is processable by the calculator 17. For example, the acquirer 16 converts the electric signal S1 to an analog voltage signal or a digital signal. For example, a sampling apparatus such as an oscilloscope, a digitizer apparatus, an A/D (analog/digital) converter, or the like may be used as the acquirer 16.

The calculator 17 calculates the position (displacement amount) of the measurement target DUT using the signal output from the acquirer 16. The calculator 17 calculates the position of the measurement target DUT based on the shape of the correlation peak and the size of the signal output from the acquirer 16 without performing an integral calculation such as a piezoelectric semiconductor acceleration sensor or an LDV known in the prior art. The details of the calculation performed by the calculator 17 will be described later.

The controller 18 controls the injection current to the semiconductor laser element provided in the light source 11, and thereby controls whether the light source 11 emits light or not. In particular, when the controller 18 makes the light source 11 emit light, the controller 18 controls alternate current, which has an arbitrary waveform for frequency-modulating the continuous wave of light L1 output from the light source 11, to be entered into the semiconductor laser element while controlling direct current above a light emission threshold value of the semiconductor laser element to be entered into the semiconductor laser element. The controller 18 may control the light source 11 with reference to the calculation results of the calculator 17. The details will be described later.

<Correlation Peak and Measuring Principle>

Hereinafter, the correlation peak and the measuring principle of the vibration or displacement of the measurement target DUT using the correlation peak will be described. The measuring apparatus 1 makes the reflected light of the reference light LR and the reflected light of the probe light LP interfere with each other by multiplexing them, and obtains the electric signal S1 indicating the interfere intensity. If the frequency of the continuous wave of light L1 output from the light source 11 is not modulated, the period of the change in intensity of the electric signal S1 is equal to one period of the wavelength of the continuous wave of light L1.

In the present embodiment, since the continuous wave of light L1 output from the light source 11 is frequency-modulated, the intensity of the electric signal S1 changes with a period of the correlation peak, which is different from the above-mentioned period (one period of the wavelength of the continuous wave of light L1). The correlation peak indicates that the correlativity of the reference light LR and the probe light LP is high. The correlation peak appears when the optical path difference between the reference light LR and the probe light LP is in a state in which the reference light LR and the probe light LP are constructive with each other. In particular, the correlation peak which appears when the optical path difference between the reference light LR and the probe light LP is equal to zero is referred to as $0^{th}$ Order Correlation Peak.

A case in which the continuous wave of light L1 output from the light source 11 is modulated based on a sine wave having a frequency fm will be described. In order to simplify the description, it is assumed that the length of the polarization maintaining optical fiber F2 is equal to 1 [m] and the length of the polarization maintaining optical fiber F3 is equal to 11 [m]. Thereby, it is assumed that the round-trip optical path length between the multiplex divider 12 and the reflector 13 is equal to 2 [m] and the round-trip optical path length between the multiplex divider 12 and the emitter 14 is equal to 22 [m]. It is assumed that the measurement target DUT is arranged at the end face of the emitter 14 and the distance from the emitter 14 to the measurement target DUT is equal to 0 [m].

Under this condition, the $0^{th}$ Order Correlation Peak appears at the position, which is distance, by 1 [m], from one end of the polarization maintaining optical fiber F3 (the end connected to the multiplex divider 12). In other words, the $0^{th}$ Order Correlation Peak appears at the position where the round-trip optical path length of the probe light LP is equal to the round-trip optical path length of the reference light LR. If reflected light or Rayleigh scattering light is generated at the position where the $0^{th}$ Order Correlation Peak appears, the reflected light or Rayleigh scattering light interferes with the reference light LR and this interference may cause measurement errors. However, since the $0^{th}$ Order Correlation Peak appears at the middle of the polarization maintaining optical fiber F3, the reflected light is not generated. Since the intensity of the Rayleigh scattering light is significantly lower than that of the reflected light from the measurement target DUT, the measurement errors hardly occurs.

The correlation peak, which appears when the optical path difference between the reference light LR and the probe light LP is equal to N times the modulation period (1/fm) of the continuous wave of light L1 (N is an integer), is referred to as $N^{th}$ Order Correlation Peak. In particular, as represented by the following equation (1), when the value obtained by dividing the optical path difference (2 L) between the reference light LR and the probe light LP by a light speed V is equal to N times the modulation period (1/fm) of the continuous wave of light L1, the $N^{th}$ Order Correlation Peak appears. In the following equation (1), the light speed V is a light speed in an optical fiber.

$$L = N*V/(2*fm) \quad (1)$$

For example, if the modulation frequency fm of the continuous wave of light L1 is equal to 10 [MHz] and the light speed V is, for example, $2*10^8$ [m/sec], the correlation peak (first Order Correlation Peak) in which N is equal to 1 in the equation (I) appears at the position where L is equal to 10 [m]. That is, the first Order Correlation Peak appears at the position distant from the $0^{th}$ Order Correlation Peak by 10 [m] (in other words, at the position of the emitter 14). As described above, since the measurement target DUT is arranged at the end face of the emitter 14, the reflected light (the reflected light of the probe light LP) is generated at the position where the first Order Correlation Peak appears. The reflected light of the probe light LP interferes with the reference light LR (the reference light LR reflected by the reflector 13), and the intensity of the electric signal S1 output from the light receiver 15 become maximum. As described above, since the reflected light of the probe light LP is generated at the position where the correlation peak appears when the measurement target DUT is arranged at the position where the correlation peak appears, the intensity of the electric signal S1 output from the light receiver 15 become maximum.

Figure 2:
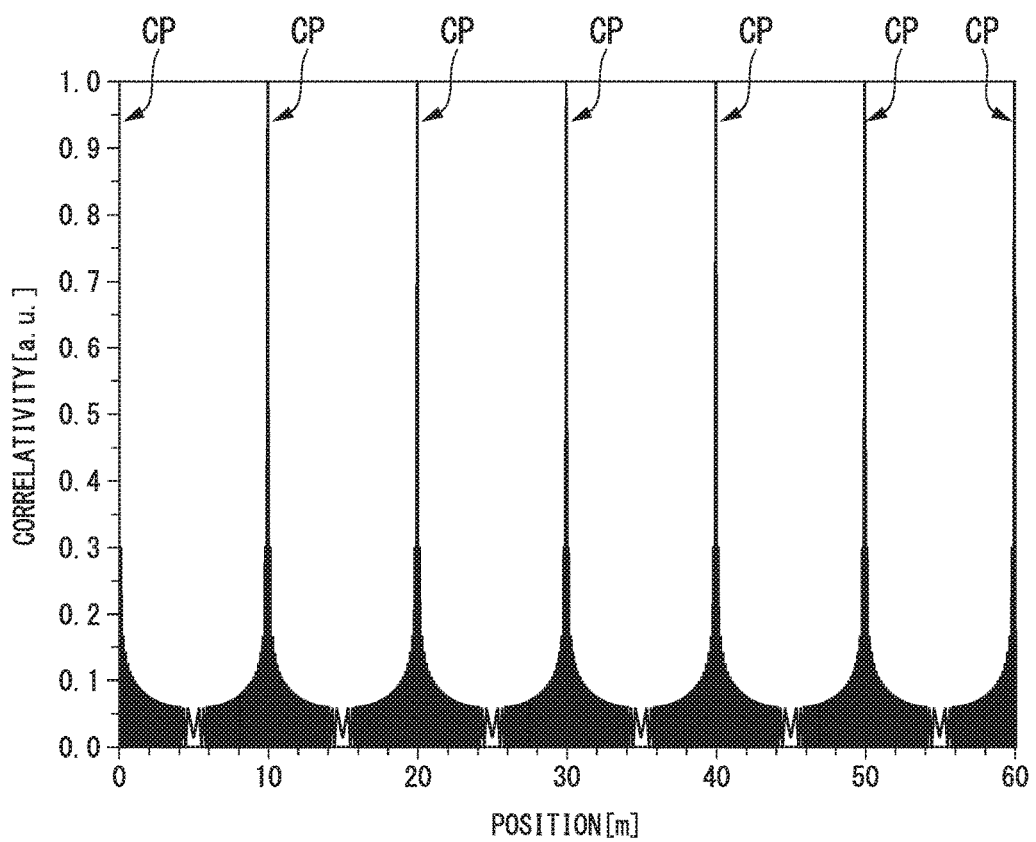
FIG. 2 is a diagram showing an example of correlation peaks in the first embodiment of the present invention.

FIG. 2 is a diagram showing an example of correlation peaks in the first embodiment of the present invention. In FIG. 2, the horizontal axis indicates the position of the measurement target DUT under the condition that the position of the emitter 14 is origin, and the vertical axis indicates the correlativity of the reference light LR and the probe light LP. The vertical axis may be read as the intensity of the electric signal S1. In FIG. 2, each of the sections where the correlativity increases delta-functionally indicates a correlation peak CP. In the example shown in FIG. 2, the first Order Correlation Peak appears at the position (origin) of 0 [m], the second Order Correlation Peak appears at the position of 10 [m], and, correlation peaks after the third Order Correlation Peak periodically appear every 10 [m].

Figure 3:
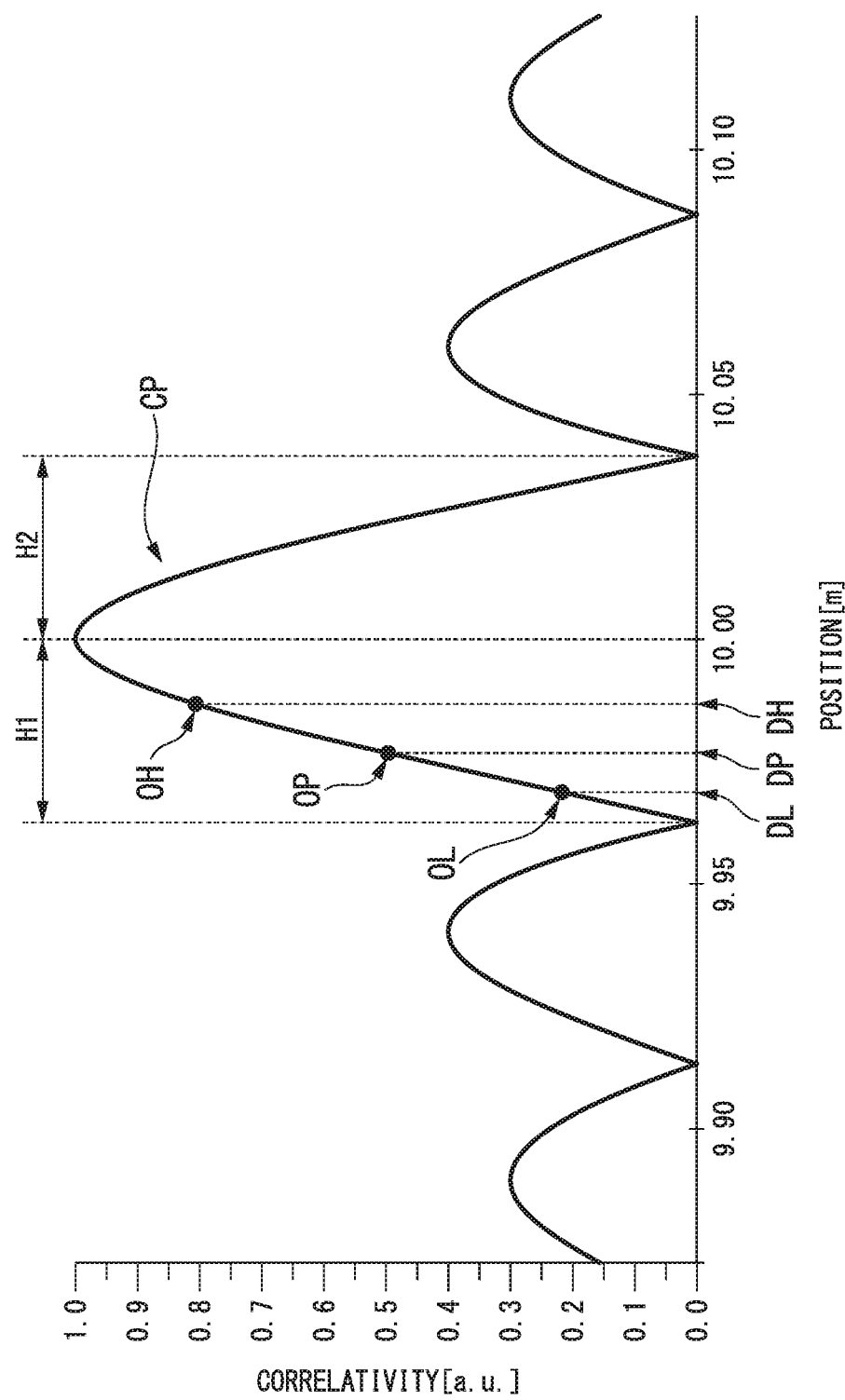
FIG. 3 is an enlarged diagram showing the correlation peak in the first embodiment of the present invention.

FIG. 3 is an enlarged diagram showing the correlation peak in the first embodiment of the present invention. FIG. 3 is an enlarged diagram of the second correlation peak shown in FIG. 2. As shown in FIG. 3, the correlation peak CP has a symmetry mountain shape (a convex upward shape), and plural mountain shaped sections, each of which is referred to as a side lobe, appear on either side of the correlation peak CP. The height of the side lobe is lower than the correlation peak CP. The former H1 of the correlation peak CP has a section indicating a change near a monotonically increasing straight line, and the latter H2 of the correlation peak CP has a section indicating a change near a monotonically decreasing straight line.

In the present embodiment, the section indicating the change near the straight line in the former H1 or the latter H2 is used, the measurement site of the measurement target DUT is arranged at the former H1 or the latter H2 of the correlation peak CP, and thereby, the vibration or displacement of the measurement target DUT is measured with high accuracy. For example, the modulation frequency fm of the light source 11 and the integer N are determined using the above-mentioned equation (1) so that the measurement site of the measurement target DUT in the static condition is arranged at the position DP (the position where the correlativity is equal to near 0.5) shown in FIG. 3. The integer N increases as the modulation frequency fm increases, and the integer N decreases as the modulation frequency fm decreases.

If the modulation frequency fm is maintained constant, the position of the correlation peak CP is not changed. Therefore, if the measurement site of the measurement target DUT is changed in a direction away from the emitter 14 of the measuring apparatus 1 (the right direction in FIG. 3), the correlativity of the reference light LR and the probe light LP increases and the intensity of the electric signal S1 increases. On the other hand, if the measurement site of the measurement target DUT is changed in a direction toward the emitter 14 of the measuring apparatus 1 (the left direction in FIG. 3) under the condition that the modulation frequency fm is maintained constant, the correlativity of the reference light LR and the probe light LP decreases and the intensity of the electric signal S1 decreases. As described above, in the present embodiment, the displacement amount of the measurement target DUT is calculated using the measured results of the intensity of the electric signal S1, based on the phenomena that the intensity of the electric signal S1 changes in accordance with the displacement amount of the measurement site of the measurement target DUT.

As shown in FIG. 3, in the section where the correlativity is high (the section where the correlativity is equal to or more than about 0.8) in the former H1 or the latter H2 of the correlation peak CP, the correlation peak CP changes in a curve. Therefore, if the section where the correlativity is high is used, it is considered that the measurement accuracy decreases. In the section where the correlativity is low (the section where the correlativity is equal to or less than about 0.2) in the former H1 or the latter H2 of the correlation peak CP, the intensity of the electric signal S1 is low. Therefore, if the section where the correlativity is low is used, it is considered that the measurement accuracy decreases due to the influence of noise and the like.

Therefore, if the displacement of the measurement target DUT (including amplitude of vibration) is arranged between the position DL shown in FIG. 3 (the position where the correlativity is equal to about 0.2) and the position DH shown in FIG. 3 (the position where the correlativity is equal to about 0.8) on the basis of the position DP shown in FIG. 3 (the position where the correlativity is equal to about 0.5), it is considered that the degradation of the measurement accuracy can be prevented. Hereinafter, the position DP shown in FIG. 3 may be referred to as an "operating point OP", the position DL shown in FIG. 3 may be referred to as a "minimum displacement point OL", and the position DH shown in FIG. 3 may be referred to as a "maximum displacement point OH".

The shape of the correlation peak CP can be calculated using the wavelength of the continuous wave of light L1 output from the light source 11, the refraction indexes of the polarization maintaining optical fibers F1 to F4, the refraction index of the optical path from the emitter 14 to the measurement target DUT, the modulation frequency fm of the continuous wave of light L1, the modulation amplitude Δf, and the modulation waveform. The calculator 17 shown in FIG. 1 calculates the shape of the correlation peak CP using them, and calculates the displacement amount of the measurement target DUT using the calculated shape of the correlation peak CP and the signal output from the acquirer 16. The vibration of the measurement target DUT can be calculated by continuously calculating the displacement amount of the measurement target DUT.

<Method for Measuring Vibration or Displacement>

Hereinafter, a method for measuring vibration or displacement will be described. As described with reference to FIG. 3, in order to measure the vibration or displacement of the measurement target DUT by the measuring apparatus 1, it is necessary to determine the modulation frequency fm and the like of the light source 11 so that the measurement site of the measurement target DUT in the static condition is arranged at the operating point OP shown in FIG. 3. Hereinafter, a process for determining the modulation frequency fm and the like of the light source 11 (hereinafter, referred to as an "initial setting process") will be described, and then a process for measuring the vibration or displacement of the measurement target DUT (hereinafter, referred to as a "measuring process") will be described.

Initial Setting Process

Figure 4:
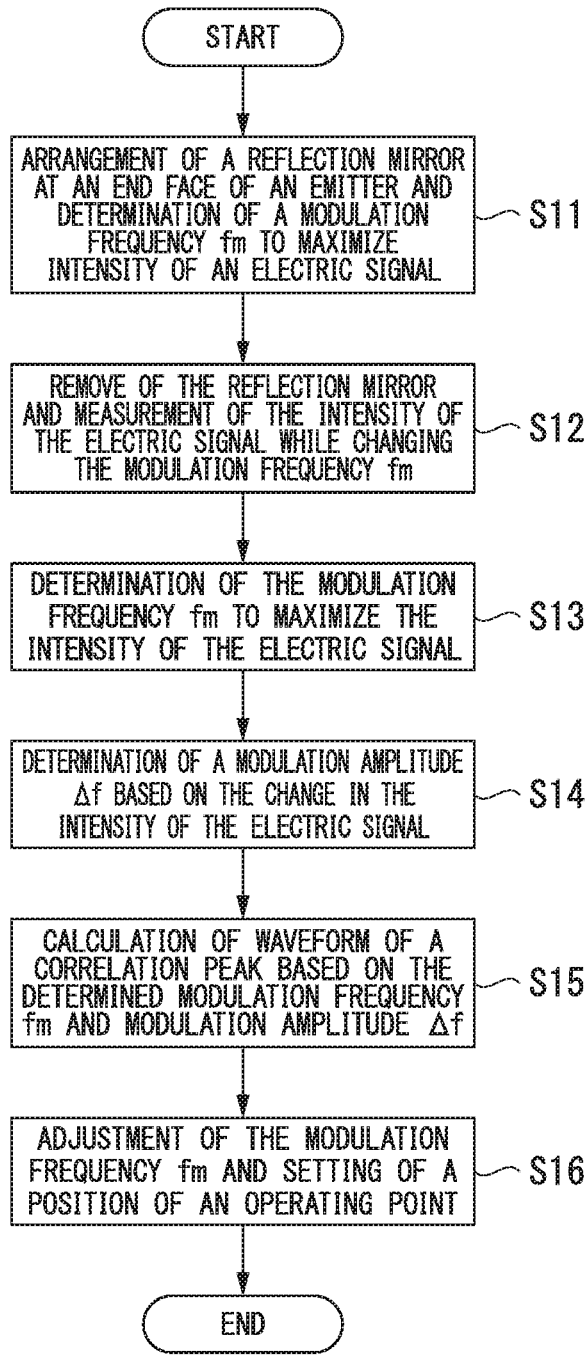
FIG. 4 is a flowchart showing an initial setting process performed in the first embodiment of the present invention.

FIG. 4 is a flowchart showing an initial setting process performed in the first embodiment of the present invention. First, as shown in FIG. 4, a processing is performed for arranging a reflection mirror not shown at the end face of the emitter 14 provided in the measuring apparatus 1 (a reference position in the optical path of the probe light LP), irradiating the reflection mirror with the probe light LP, and determining the modulation frequency fm to maximize the intensity of the electric signal S1 (step S11: first initial step). In actuality, it is difficult to accurately understand the lengths of the polarization maintaining optical fibers F2 and F3. Therefore, the processing is performed for accurately understanding the optical path difference between the probe light LP and the reference light LR based on the adjustment of the modulation frequency fm.

The arrangement of the reflection mirror not shown to the end face of the emitter 14 is performed by, for example operators who perform the arrangement of the measuring apparatus 1, the maintenance, or the like. For example, a plane mirror having a plane reflecting surface may be used as the reflection mirror, but an arbitrary mirror which reflects the probe light LP emitted from the end face of the emitter 14 and inputs the reflected light into the emitter 14 may be used.

When the arrangement of the reflection mirror is finished and the processing of the step S11 is started, the light source 11 is controlled by the controller 18 and the continuous wave of light L1 modulated based on the predetermined modulation frequency fm is output from the light source 11. The continuous wave of light L1 output from the light source 11 is entered into the multiplex divider 12 via the polarization maintaining optical fiber F1, and is divided into the reference light LR and the probe light LP while maintaining the polarization state.

The divided reference light LR passes through the polarization maintaining optical fiber F2, is reflected by the reflector 13 while maintaining the polarization state, passes through the polarization maintaining optical fiber F2 in the reverse direction, and then is entered into the multiplex divider 12. On the other hand, the divided probe light LP passes through the polarization maintaining optical fiber F3, is reflected by the reflection mirror not shown arranged at the end face of the emitter 14 while maintaining the polarization state, passes through the polarization maintaining optical fiber F3 in the reverse direction, and then is entered into the multiplex divider 12.

The reflected light of the reference light LR and the reflected light of the probe light LP, which are entered into the multiplex divider 12, are multiplexed while maintaining their polarization states. The light multiplexed by the multiplex divider 12 passes through the polarization maintaining optical fiber F4, and then is received by the light receiver 15. Thereby, the electric signal S1 indicating the interference intensity of the reference light LR and the probe light LP is output from the light receiver 15. The electric signal S1 output from the light receiver 15 is converted, by the acquirer 16, to a signal processible by the calculator 17, and then input into the calculator 17. Then, the processing for measuring the intensity of the electric signal S1 is performed.

After the above-mentioned processing is finished, a processing is performed for changing the modulation frequency fm of the continuous wave of light L1 by a predetermined frequency under the control of the controller 18, converting the electric signal S1 having the changed modulation frequency fm by the acquirer 16, inputting the converted signal S1 into the calculator 17, and measuring the intensity of the converted electric signal S1. Then, a processing is repeatedly performed for changing the modulation frequency fm of the continuous wave of light L1 by a predetermined frequency and measuring the intensity of the electric signal S1 having the changed modulation frequency fm under the control of the controller 18. After these repeated processing is finished, the controller 18 determines the modulation frequency fm to maximize the intensity of the electric signal S1 measured by the calculator 17. The determined modulation frequency fm is set so that one of the correlation peaks (for example, the first Order Correlation Peak) appears at the position of the end face of the emitter 14.

Next, a processing is performed for removing the reflection mirror not shown arranged at the end face of the emitter 14, irradiating the measurement target DUT with the probe light LP, and measuring the intensity of the electric signal S1 by the calculator 17 while changing the modulation frequency fm of the continuous wave of light L1 (step S12: second initial step). It is assumed that the probe light LP, with which the measurement target DUT is irradiated, is reflected by the measurement target DUT and is entered into the end face of the emitter 14. The remove of the reflection mirror not shown is performed by, for example, operators who perform the arrangement of the measuring apparatus 1, the maintenance, or the like.

When the processing of the step S12 is started, the modulation frequency fm of the continuous wave of light L1 is set to be a frequency different from the modulation frequency fm determined in the above-mentioned step S11 by a predetermined frequency under the control of the controller 18. For example, the modulation frequency fm of the continuous wave of light L1 is set to be a frequency which is slightly lower than the modulation frequency fm determined in the above-mentioned step S11. If the modulation frequency fm of the continuous wave of light L1 is set to be such a frequency, the value of L in the above-mentioned equation (1) becomes slightly larger. Thereby, the correlation peak (for example, the first Order Correlation Peak) which appears at the end face of the emitter 14 moves toward the measurement target DUT from the end face of the emitter 14. Then, the calculator 17 measures the maximum value of the intensity of the electric signal S1 (peak intensity) in this state.

Then, similarly, a processing is repeatedly performed for measuring the peak intensity of the electric signal S1 while changing the modulation frequency fm of the continuous wave of light L1. That is, a processing is performed for measuring the peak intensity of the electric signal S1 while scanning modulation frequency fm and gradually moving the position of the correlation peak. By performing such a processing, the light receiving intensity distribution indicating the relationship between the distance from the measuring apparatus 1 (the distance from the end face of the emitter 14) and the changing in the peak intensity of the electric signal S1.

When the measurement target DUT remains stationary, the light receiving intensity distribution obtained in the above-mentioned processing indicates the waveform of the correlation peak. The position where the maximum value of the light receiving intensity distribution is obtained corresponds to the position where the measurement site of the measurement target DUT is arranged. Therefore, by calculating the light receiving intensity distribution in the above-mentioned processing, the position of the measurement target DUT which remains stationary can be calculated.

Figure 5:
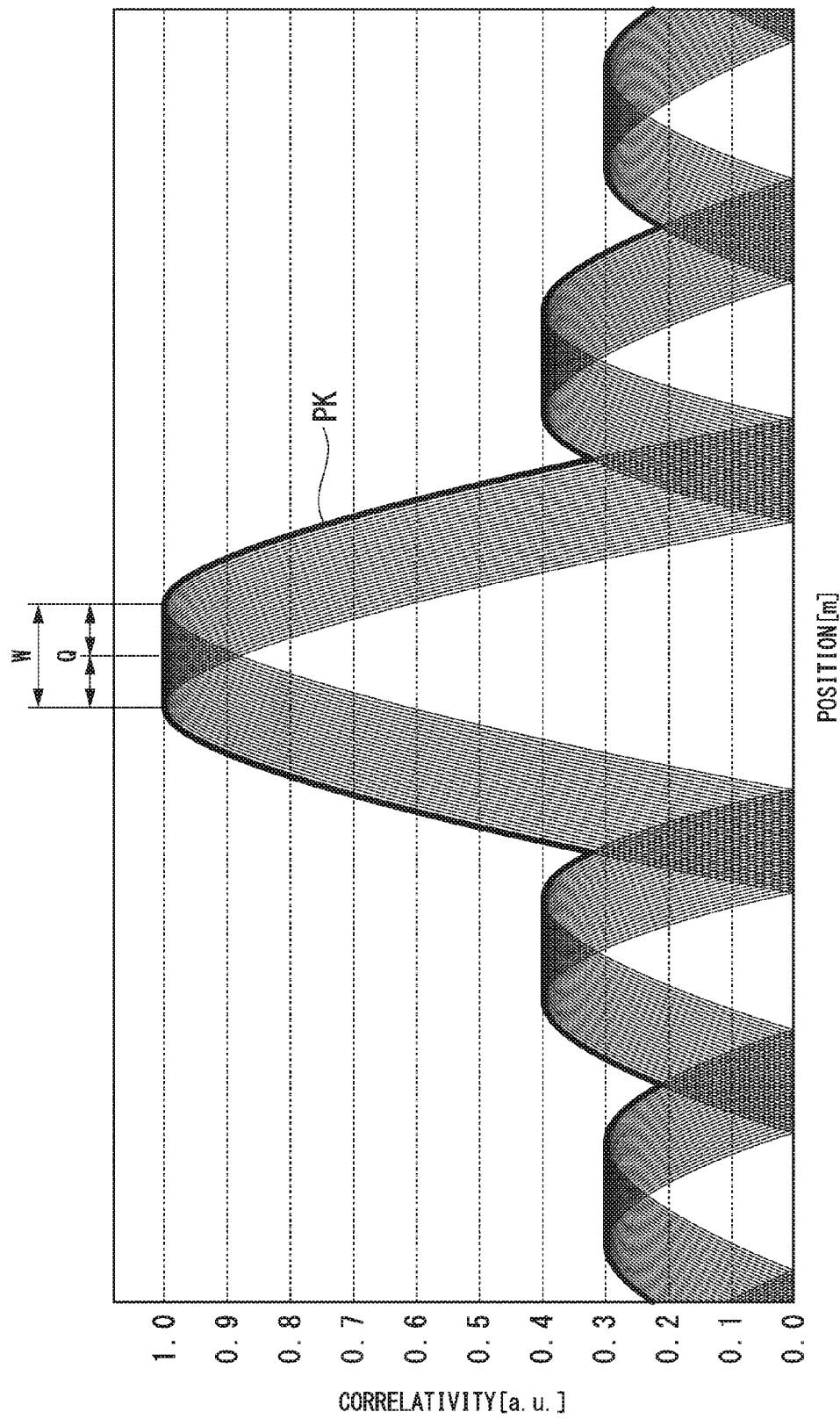
FIG. 5 is a diagram showing an example of intensity of electric signal measured when a measurement target vibrates in the first embodiment of the present invention.

On the other hand, when the measurement target DUT does not remain stationary (for example, when the measurement target DUT vibrates), even if the modulation frequency fm is constant, the intensity of the electric signal S1 to be measured by the calculator 17 changes over time. FIG. 5 is a diagram showing an example of electric signal intensity measured when the measurement target vibrates in the first embodiment of the present invention. In FIG. 5, similarly to FIGS. 2 and 3, the vertical axis may be read as the intensity of the electric signal S1.

For example, when the position of the measurement target DUT moves to the left side of the correlation peak, the light receiving intensity when the correlation peak moves relatively to the right side with respect to the measurement target DUT is obtained. On the other hand, when the position of the measurement target DUT moves to the right side of the correlation peak, the light receiving intensity when the correlation peak moves relatively to the left side with respect to the measurement target DUT is obtained. As described above, when the measurement target DUT does not remain stationary, the intensity of the electric signal S1 to be measured by the calculator 17 changes over time.

In the present embodiment, the static position of the measurement target DUT (the arrangement position when the measurement target DUT remains stationary) is calculated by measuring the maximum value of the intensity of the electric signal S1 (peak intensity). In particular, the curve assigned with a reference PK in FIG. 5 indicates the peak intensity measured by the calculator 17. For example, the peak intensity is calculated by holding the maximum value of the intensity measured by the calculator 17 (peak hold) during at least one period of the vibration of the measurement target DUT when the modulation frequency fm is set to be some frequency.

FIG. 5 shows that the range in which the maximum value of the correlation peak can be obtained is enlarged by the degree of vibration of the measurement target DUT. That is, in the example shown in FIG. 5, the maximum value of the correlation peak is obtained in the range assigned with a reference W. Therefore, when the measurement target DUT does not remain stationary, the calculator 17 calculates a center position Q in the range assigned with the reference W as the static position of the measurement target DUT, and calculates the half of the length of the range assigned with the reference W as a displacement amplitude.

Next, the calculator 17 determines a modulation frequency fm0 for arranging one of the correlation peaks at the position of the measurement target DUT in the stationary state (or, the static position) based on the position where the intensity of the electric signal S1 is maximum (or, the center position Q of the range where the intensity of the electric signal S1 is maximum) (step S13). The calculator 17 determines the modulation amplitude Δf based on the range of the reference W (step S14).

Subsequently, the calculator 17 calculates the waveform of the correlation peak based on the calculated modulation frequency fm0 and the modulation amplitude Δf (step S15). For example, the waveform of the correlation peak CP shown in FIG. 3 is calculated by this processing. After the above-mentioned processing is finished, the modulation frequency fm is adjusted so that the measurement site of the measurement target DUT which remains stationary or the measurement site of the measurement target DUT arranged at the static position is arranged at the operating point OP shown in FIG. 3 (step S16: third initial step).

Measuring Process

Figure 6:
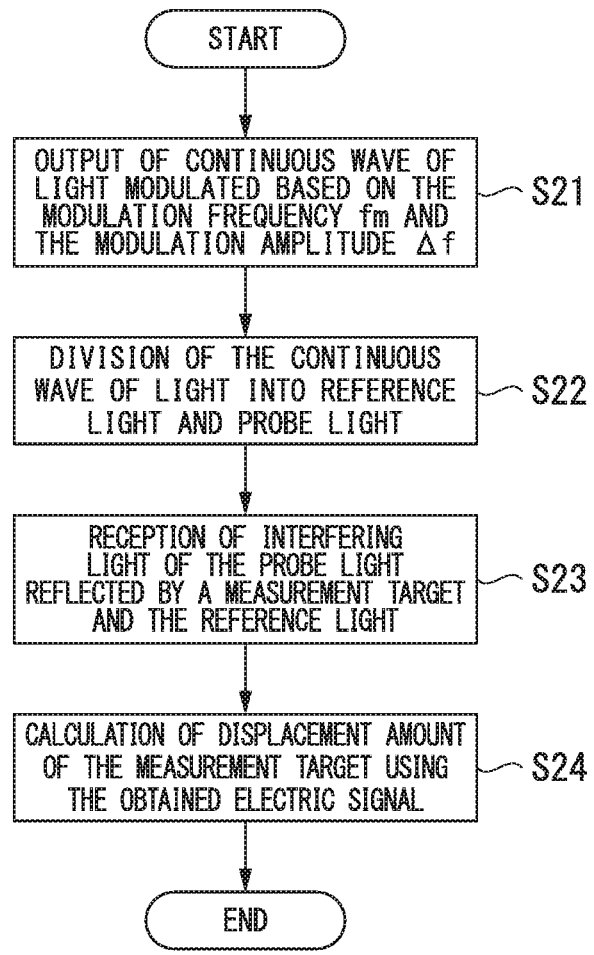
FIG. 6 is a flowchart showing a measuring process performed in the first embodiment of the present invention.

FIG. 6 is a flowchart showing a measuring process performed in the first embodiment of the present invention. When the process is started, the controller 18 controls the light source 11 to emit the continuous wave of light L1 modulated based on the modulation frequency fm and the modulation amplitude Δf, which have been finally determined in the above-mentioned initial setting process (step S21: first step). The continuous wave of light L1 output from the light source 11 is entered into the multiplex divider 12 via the polarization maintaining optical fiber F1, and is divided into the reference light LR and the probe light LP while maintaining the polarization state (step S22: second step).

The divided reference light LR passes through the polarization maintaining optical fiber F2, is reflected by the reflector 13 while maintaining the polarization state, passes through the polarization maintaining optical fiber F2 in the reverse direction, and then is entered into the multiplex divider 12. On the other hand, the divided probe light LP passes through the polarization maintaining optical fiber F3, is output from the emitter 14 to the outside of the measuring apparatus 1 while maintaining the polarization state, passes through the optical path shown in FIG. 1, and then is entered into the measurement site of the measurement target DUT. The reflected light of the probe light LP, with which the measurement target DUT has been irradiated, passes through the optical path shown in FIG. 1 in the reverse direction, is entered into the emitter 14, passes through the polarization maintaining optical fiber F3 in the reverse direction, and then is entered into the multiplex divider 12.

The reflected light of the reference light LR and the reflected light of the probe light LP, which have been entered into the multiplex divider 12, are multiplexed while maintaining their polarization states. The light multiplexed by the multiplex divider 12 passes through the polarization maintaining optical fiber F4, and then is received by the light receiver 15 (step S23: third step). Thereby, the light receiver 15 outputs the electric signal S1 indicating the interference intensity of the reference light LR and the probe light LP. The electric signal S1 output from the light receiver 15 is converted by the acquirer 16 to a signal, which is processable by the calculator 17, and then is entered into the calculator 17.

When the calculator 17 receives the signal from the acquirer 16, as described above, the calculator 17 calculates the shape of the correlation peak CP, and calculates the displacement amount of the measurement target DUT using the calculated shape of the correlation peak CP and the signal output from the acquirer 16 (step S24: fourth step). Such a processing for calculating the displacement amount of the measurement target DUT is continuously performed, and the vibration of the measurement target DUT is calculated.

The calculator 17 may calculate the shape of the correlation peak CP and fit a function to the calculated correlation peak CP using a common optimization method. Generally, the function used for the fitting is a linear function or a quadratic function, but may be a higher dimensional function or non-linear function. An arbitrary function may be used for the fitting. If a linear function is usable for the fitting, the displacement amount of the measurement target DUT can be calculated by a quite easy calculation.

If the above-mentioned fitting is performed by the calculator 17, the controller 18 may control the light source 11 to automatically set the minimum displacement point OL and the maximum displacement point OH shown in FIG. 3 so that the error of the function fit by the calculator 17 is in an allowable range. For example, if a measurable distance range (the distance between the minimum displacement point OL and the maximum displacement point OH) is narrower than the maximum displacement amount of the measurement target DUT, the controller 18 controls the light source 11 to change the shape of the correlation peak CP. Thereby, the measurable distance range can be extended. In particular, if the modulation of the continuous wave of light L1 is performed using a sin wave, the width of the correlation peak CP is extended by decreasing the modulation amplitude Δf. Thereby, the measurable distance range can be extended.

On the other hand, if a measurable distance range (the distance between the minimum displacement point OL and the maximum displacement point OH) is significantly wider than the maximum displacement amount of the measurement target DUT, small section of the slope of the correlation peak CP is used. In such a case, the controller 18 controls the light source 11 to change the shape of the correlation peak CP so that a measurable distance range is narrowed. Thereby, the sensitivity for the displacement amount of the measurement target DUT is improved. In particular, if the modulation of the continuous wave of light L1 is performed using a sin wave, the width of the correlation peak CP is narrowed and the slope becomes steep by increasing the modulation amplitude $\Delta f$. Thereby, the sensitivity for the displacement amount of the measurement target DUT is improved.

As described above, in the present embodiment, the continuous wave of light L1 output from the light source 11 is frequency-modulated so that the measurement site of the measurement target DUT is arranged at the former H1 or the latter H2 of the correlation peak CP, and the continuous wave of light L1 is divided, by the multiplex divider 12, into the reference light LR and the probe light LP. Then, the reference light LR reflected by the reflector 13 and the probe light LP reflected by the measurement target DUT are multiplexed by the multiplex divider 12, are received by the light receiver 15, and the vibration or displacement of the measurement target DUT is calculated using the obtained electric signal S1.

Therefore, in the present embodiment, since a dynamic range is not restricted unlike in the case of a prior acceleration sensor and integral calculation is not required unlike the prior art, a wide dynamic range is achieved and a measurement with higher accuracy than the prior art can be performed. In the present embodiment, since a sweep of optical path difference using an optical modulator is not required unlike in the case of a prior laser interferometer, the measuring apparatus 1 can be realized without increasing cost, i.e. with low cost.

In the present embodiment, before the measurement of the measurement target DUT, the position where the correlation peak appears is changed by scanning the modulation frequency fm of the continuous wave of light L1, and the modulation frequency fm0 is determined for arranging one of the correlation peaks at the position of the measurement target DUT in the stationary state (or, the static position). Then, the shape of the correlation peak is calculated based on the determined modulation frequency fm0 and the modulation amplitude $\Delta f$, the modulation frequency fm is adjusted so that the measurement site of the measurement target DUT which remains stationary or the measurement site of the measurement target DUT arranged at the static position is set to be the operating point OP shown in FIG. 3. Therefore, in the present embodiment, the adjustment of the modulation frequency fm required to contactlessly measure the vibration or displacement of the measurement target DUT can be performed shortly and automatically.

Second Embodiment

Figure 7:
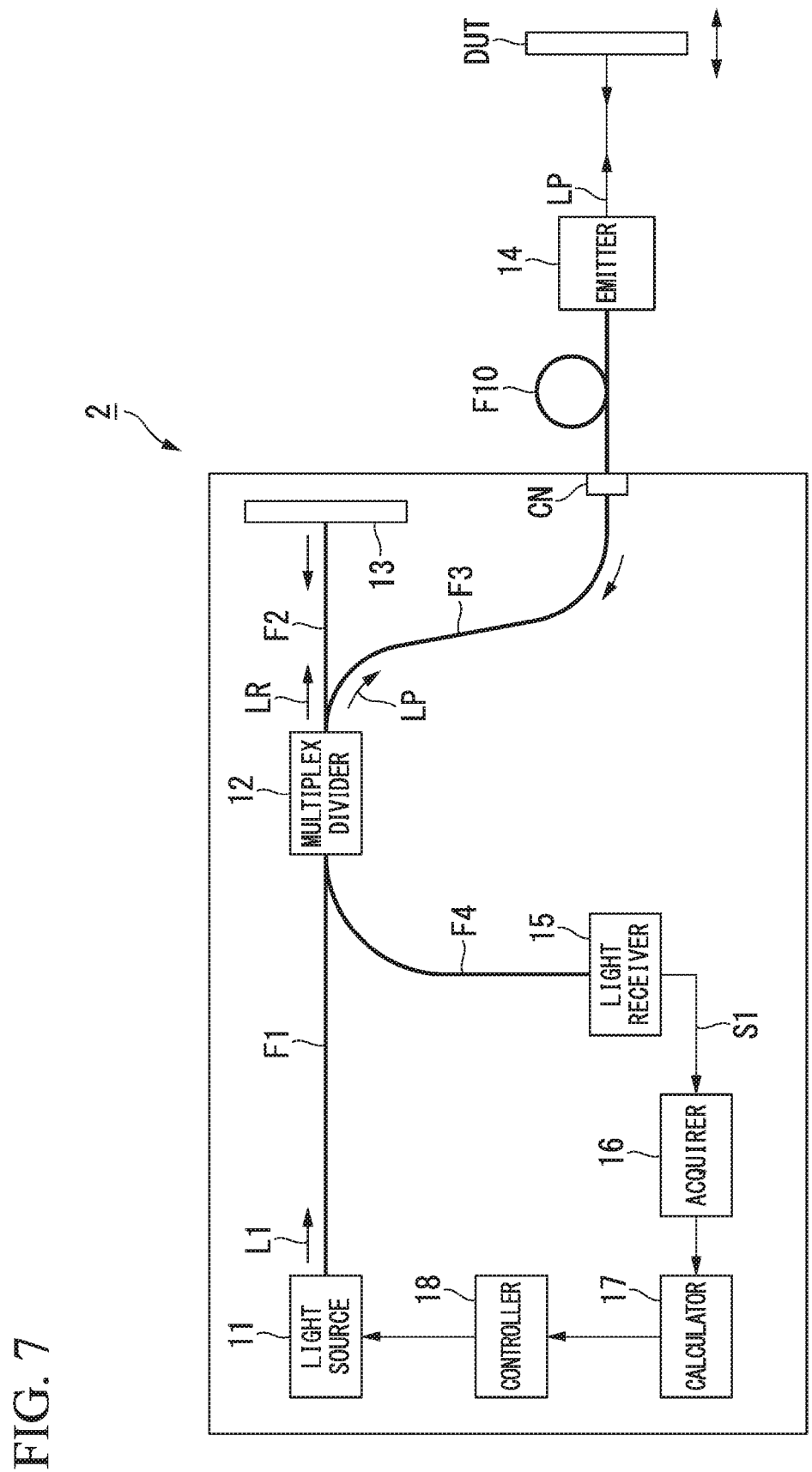
FIG. 7 is a block diagram showing main components of a measuring apparatus for measuring vibration or displacement according to a second embodiment of the present invention.

FIG. 7 is a block diagram showing main components of a measuring apparatus for measuring vibration or displacement according to a second embodiment of the present invention. In FIG. 7, blocks that correspond to those in FIG. 1 are assigned the same reference numerals. As shown in FIG. 7, a measuring apparatus 2 for measuring vibration or displacement has a configuration in which the emitter 14 included in the measuring apparatus 1 shown in FIG. 1 is replaced by a connector CN. Such as a measuring apparatus 2 can measure, a site such as inside of the measurement target DUT which cannot be directly seen from the measuring apparatus 2.

One end of a polarization maintaining optical fiber F10 (optical fiber) is connected to the connector CN. The other end of the polarization maintaining optical fiber F10 is connected to the emitter 14. The polarization maintaining optical fiber F10 leads the probe light LP, which has passed through the polarization maintaining optical fiber F3, to an irradiation position for emitting the probe light LP to the measurement target DUT. The attachment of such a polarization maintaining optical fiber F10 enables to irradiate an arbitrary site of the measurement target DUT with the probe light LP, to irradiate the measurement target DUT with the probe light LP from an arbitrary direction, and to lead the probe light LP to the inside of the measurement target DUT. Therefore, the site such as inside of the measurement target DUT can be measured.

In the present embodiment, as with the first embodiment, the continuous wave of light L1 output from the light source 11 is frequency-modulated so that the measurement site of the measurement target DUT is arranged at the former H1 or the latter H2 of the correlation peak CP, and the continuous wave of light L1 is divided, by the multiplex divider 12, into the reference light LR and the probe light LP. Then, the reference light LR reflected by the reflector 13 and the probe light LP reflected by the measurement target DUT are multiplexed by the multiplex divider 12, are received by the light receiver 15, and the vibration or displacement of the measurement target DUT is calculated using the obtained electric signal S1. Therefore, as with the first embodiment, a wide dynamic range is achieved and a measurement with higher accuracy than the prior art can be performed.

Third Embodiment

Figure 8:
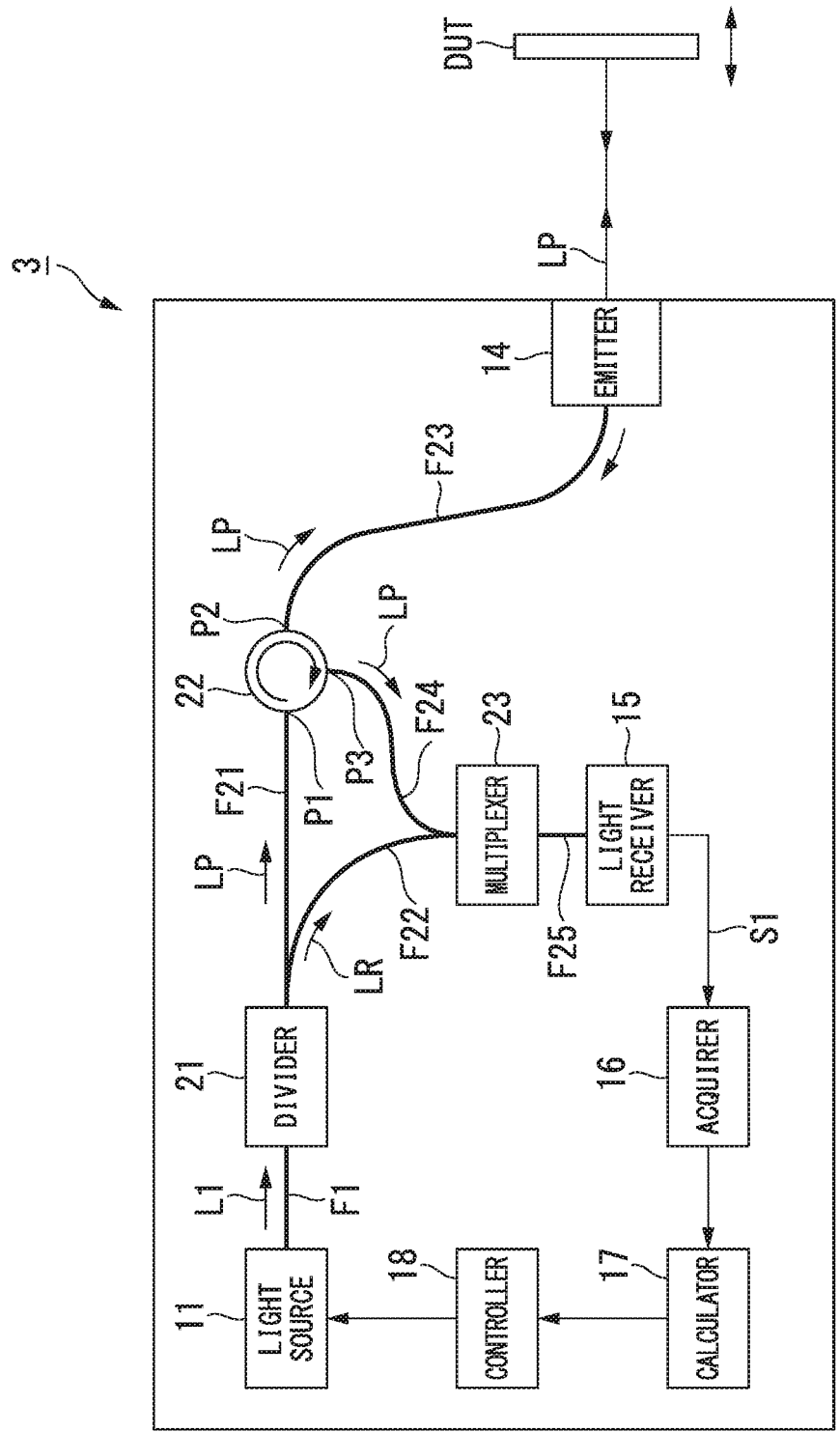
FIG. 8 is a block diagram showing main components of a measuring apparatus for measuring vibration or displacement according to a third embodiment of the present invention.

FIG. 8 is a block diagram showing main components of a measuring apparatus for measuring vibration or displacement according to a third embodiment of the present invention. In FIG. 8, blocks that correspond to those in FIG. 1 are assigned the same reference numerals. As shown in FIG. 8, a measuring apparatus 3 for measuring vibration or displacement according to the present embodiment has a configuration in which a divider 21, an optical circulator 22, a multiplexer 23, and polarization maintaining optical fibers F21 to F25 are provided instead of the multiplex divider 12, the reflector 13, and the polarization maintaining optical fibers F2 to F4, which are included in the measuring apparatus 1 shown in FIG. 1. Such a measuring apparatus 3 reduces the loss of the probe light LP to improve a S/N (signal to noise ratio).

The divider 21 has one input, to which the polarization maintaining optical fiber F1 is connected, and two outputs, to which the polarization maintaining optical fibers F21 and F22 are respectively connected. The divider 21 divides a wave of light, which is input from the input, into two waves of light and outputs the two waves of light from the two outputs, respectively. In particular, the divider 21 divides a wave of light (a continuous wave of light L1) input from the input, to which the polarization maintaining optical fiber F1 is connected, into reference light LR and probe light LP while maintaining the polarization state. The divider 21 outputs the divided probe light LP from a first output, to which the polarization maintaining optical fiber F21 is connected, and outputs the divided reference light LR from a second output, to which the polarization maintaining optical fiber F22 is connected. The division ratio of the divider 21 is arbitrary as with the multiplex divider 12 shown in FIG. 1.

The optical circulator 22 includes an input/output P1, to which the polarization maintaining optical fiber F21 is connected, an input/output P2, to which the polarization maintaining optical fiber F23 is connected, and an input/output P3, to which the polarization maintaining optical fiber F24 is connected. The optical circulator 22 outputs light, which is input from input/output P1, from the input/output P2, outputs light, which is input from input/output P2, from the input/output P3, and outputs light, which is input from input/output P3, from the input/output P1. The optical circulator 22 performs the above-mentioned input and output of light while maintaining the polarization state. The polarization maintaining optical fiber F23 is also connected to the emitter 14.

The multiplexer 23 includes two inputs, to which the polarization maintaining optical fibers F22 and F24 are respectively connected, and one output, to which the polarization maintaining optical fiber F25 is connected. The multiplexer 23 multiplexes a wave of light (the reference light LR) input from the input, to which the polarization maintaining optical fiber F22 is connected, and a wave of light (the reflected light of the probe light LP) input from the input, to which the polarization maintaining optical fiber F24 is connected, while maintaining their polarization states, and outputs the multiplexed light from the output, to which the polarization maintaining optical fiber F25 is connected.

Hereinafter, the operation of the measuring apparatus 3 will be briefly described. When the operation of the measuring apparatus 3 is started, as with the first and second embodiments, the controller 18 controls the light source 11 to emit the continuous wave of light L1 modulated based on the modulation frequency fm determined in the above-mentioned initial setting process. The continuous wave of light L1 output from the light source 11 is entered into the divider 21 via the polarization maintaining optical fiber F21, and divided into the reference light LR and the probe light LP while maintaining the polarization state.

The divided probe light LP passes through the polarization maintaining optical fiber F21, is entered into the input/output P1 included in the optical circulator 22 and then is output from the input/output P2 included in the optical circulator 22 while maintaining the polarization state. Then, the divided probe light LP passes through the polarization maintaining optical fiber F23, is output from the emitter 14 to the outside of the measuring apparatus 3 while maintaining the polarization state, passes through the optical path shown in FIG. 8, and then is entered into the measurement site of the measurement target DUT. On the other hand, the divided reference light LR passes through the polarization maintaining optical fiber F22, and then is entered into the multiplexer 23.

The reflected light of the probe light LP entered into the measurement target DUT passes through the optical path shown in FIG. 8 in the reverse direction, and then the reflected light is entered into the emitter 14. The reflected light passes through the polarization maintaining optical fiber F23 in the reverse direction, is entered into the input/output P2 included in the optical circulator 22, and then is output from the input/output P3 included in the optical circulator 22 while maintaining the polarization state. The reflected light passes through the polarization maintaining optical fiber F24, is entered into the multiplexer 23, and then is multiplexed with the reference light LR. The light multiplexed by the multiplexer 23 (the interfering light of the reference light LR and the reflected light of the probe light LP) passes through the polarization maintaining optical fiber F25, and then is received by the light receiver 15.

Therefore, an electric signal S1 indicating the interference intensity of the reference light LR and the reflected light of the probe light LP is output from the light receiver 15. After the electric signal S1 output from the light receiver 15 is converted by the acquirer 16 to a signal, which is processable by the calculator 17, the signal is entered into the calculator 17. As described above, the calculator 17 calculates the shape of the correlation peak CP, and calculates the displacement amount of the measurement target DUT using the calculated shape of the correlation peak CP and the signal output from the acquirer 16.

As described above, in the present embodiment, the optical circulator 22 is provided between the divider 21 and the emitter 14, all reflected light of the probe light LP entered into the input/output P2 included in the optical circulator 22 is output from the input/output P3. Since the reflected light of the probe light LP is not divided by the multiplex divider 12 unlike in the cases of the first and second embodiments, the loss of the probe light LP can be reduced. Therefore, the S/N (signal to noise ratio) can be improved.

Figure 9A:
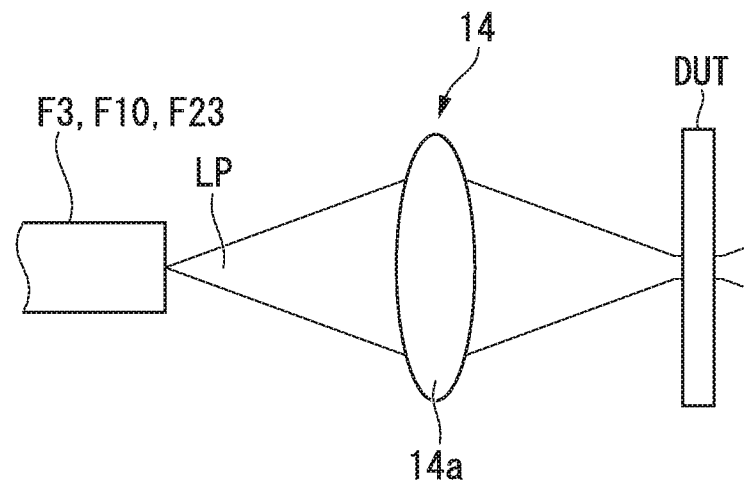
FIG. 9A is a diagram showing a configuration example of an emitter in the first to third embodiments of the present invention.
Figure 9B:
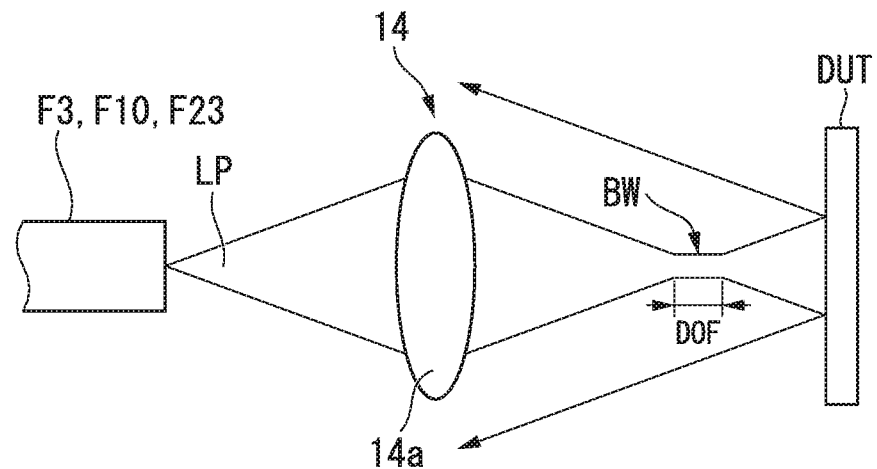
FIG. 9B is a diagram showing a configuration example of an emitter in the first to third embodiments of the present invention.

Hereinafter, an example of the specific configuration of the emitter 14 used in the first to third embodiments will be described. Each of FIGS. 9A and 9B is a diagram showing a configuration example of an emitter in the first to third embodiments of the present invention. As shown in FIG. 9A, the emitter 14 includes a biconvex lens 14a (lens) arranged at a position a predetermined distance away from the end of the polarization maintaining optical fiber F3, the polarization maintaining optical fiber F10, or the polarization maintaining optical fiber F23 (hereinafter, abbreviated to a "polarization maintaining optical fiber F3 and the like"). The biconvex lens 14a is arranged between the end of the polarization maintaining optical fiber F3 and the like and the measurement target DUT so that the probe light LP emitted from the end of the polarization maintaining optical fiber F3 and the like is focused on the measurement site of the measurement target DUT and the probe light LP reflected by the measurement target DUT is focused on the end of the polarization maintaining optical fiber F3 and the like.

The numerical aperture (NA) of the biconvex lens 14a may correspond to the numerical aperture of the polarization maintaining optical fiber F3 and the like. The polarization maintaining optical fiber F3 and the like and the biconvex lens 14a may be modularized to prevent the misalignment of the end of the polarization maintaining optical fiber F3 and the like and the biconvex lens 14a. An arbitrary method may be used to modularize the polarization maintaining optical fiber F3 and the like and the biconvex lens 14a, for example, a method that the polarization maintaining optical fiber F3 and the like and the biconvex lens 14a are hardened by a resin so that the optical path of the probe light LP is not interrupted.

As shown in FIG. 9B, the probe light LP is not focused on one point completely, but is focused on a spot ranging in size, by the biconvex lens 14a. The position where the diameter of the spot is minimum is referred to as a beam waist BW, and the distance in an optical axis direction in which the probe light LP is spread to a predetermined size with respect to the radius of the beam waist BW is referred to as a depth of focus (DOF).

When the measurement target DUT vibrates within the above-mentioned depth of focus DOF, the probe light LP reflected by the measurement target DUT is focused by the biconvex lens 14a on the end of the polarization maintaining optical fiber F3 and the like and is entered into the polarization maintaining optical fiber F3 and the like, as show in FIG. 9A. Therefore, when the vibration or displacement of the measurement target DUT is small enough to be within the depth of focus DOF, the vibration or displacement can be measured by the emitter 14 having the configuration shown in FIG. 9A.

On the other hand, when the measurement target DUT deviates from the above-mentioned depth of focus DOF significantly, there are some cases where the probe light LP reflected by the measurement target DUT is spread beyond the diameter of the biconvex lens 14a, as show in FIG. 9B. Since the probe light LP spread beyond the diameter of the biconvex lens 14a is not focused on the end of the polarization maintaining optical fiber F3 and the like, the error in the intensity of the probe light LP (the intensity of the electric signal S1) is occurred and large vibration or displacement cannot be measured with high accuracy.

Figure 10:
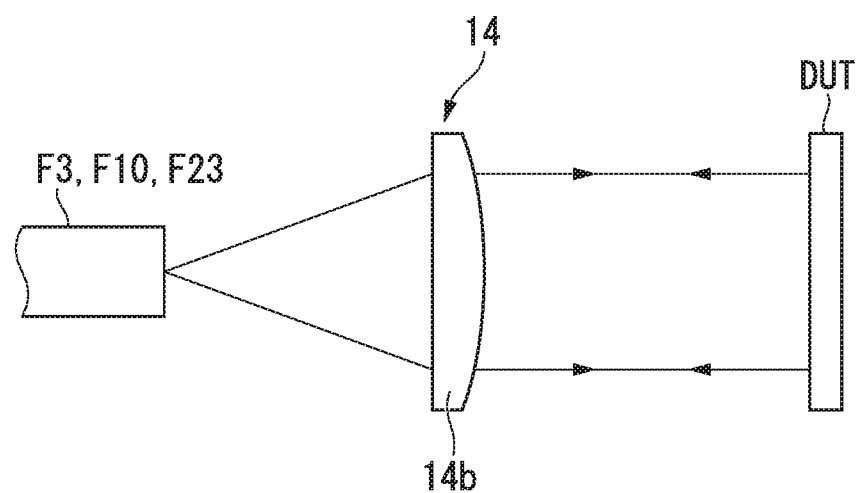
FIG. 10 is a diagram showing another configuration example of an emitter in the first to third embodiments of the present invention.

FIG. 10 is a diagram showing another configuration example of an emitter in the first to third embodiments of the present invention. As show in FIG. 10, the emitter 14 includes a cylindrical lens 14b (lens) arranged at a position a predetermined distance away from the end of the polarization maintaining optical fiber F3 and the like. The cylindrical lens 14b is arranged between the end of the polarization maintaining optical fiber F3 and the like and the measurement target DUT so that the focal position is arranged at the end of the polarization maintaining optical fiber F3 and the like.

The cylindrical lens 14b collimates the probe light LP emitted from the end of the polarization maintaining optical fiber F3 and the like, and the collimated probe light LP reflected by the measurement target DUT is focused on the end of the polarization maintaining optical fiber F3 and the like. Using such a cylindrical lens 14, even if the vibration or displacement of the measurement target DUT is large, a situation is prevented that the probe light LP reflected by the measurement target DUT deviates from the cylindrical lens 14b and is not focused on the end of the polarization maintaining optical fiber F3 and the like. Therefore, even if the vibration or displacement of the measurement target DUT is large, the vibration or displacement of the measurement target DUT can be measured with high accuracy.

Although the foregoing has been a description of the measuring apparatus for measuring vibration or displacement according to the embodiments of the present invention, the specific configuration of the present invention is not limited to the embodiments described above, and can be freely modified within the scope of the present invention. For example, in the above-mentioned first and second embodiments, the example has been described where the light source 11, the multiplex divider 12, the reflector 13, the emitter 14, and the light receiver 15 are connected to one another by the polarization maintaining optical fibers F1 to F4. In the above-mentioned third embodiment, the example has been described where the light source 11, the divider 21, the optical circulator 22, the emitter 14, the multiplexer 23, and the light receiver 15 are connected to one another by the polarization maintaining optical fibers F1 and F21 to F25. However, an optical waveguide or a spatial transmission line may be used instead of the polarization maintaining optical fibers F1 to F4 and F21 to F25. A flat lens having refractive-index distribution or the like may be used as the emitter 14.

In the above-mentioned embodiments, the example has been described where the continuous wave of light L1 is frequency-modulated so that the measurement site of the measurement target DUT is arranged at the former H1 or the latter H2 of the correlation peak CP. However, the measurement of the vibration or displacement of the measurement target DUT is possible as long as the measurement site of the measurement target DUT is arranged within the correlation peak CP. For example, even if the measurement site of the measurement target DUT vibrates across the former H1 and the latter H2 of the correlation peak CP, the measurement of the vibration is possible. In light of measurement accuracy, the section indicating the change near the straight line in the former H1 or the latter H2 may be used.

In the above-mentioned embodiments, the example has been described where the polarization maintaining optical fibers F1 to F4, F10, and F21 to F25 are used. However, normal optical fibers which do not have a polarization maintaining function may be used instead of the polarization maintaining optical fibers F1 to F4, F10, and F21 to F25. When the normal optical fibers which do not have a polarization maintaining function are used, the polarization state of the reference light LR and the probe light LP may be scrambled using a polarization scrambler or the like.

Finally, a reflectometer is referred to as an Optical Correlation Domain Reflectometry (OCDR) which divides laser emitted from a light source (frequency-modulated laser) into first and second lasers, makes scattered light, which is obtained by inputting the first laser into an optical fiber, interfere with the second laser, and observes the distribution of scattered light generated in accordance with the state in the optical fiber. Since the measuring apparatus for measuring vibration or displacement of the present invention is not a reflectometer, but an interferometer, the measuring apparatus of the present invention may be referred to as an Optical Correlation Domain Interferometry (OCDI).

What is claimed is:

1. A measuring apparatus for contactlessly measuring vibration or displacement of a measurement target comprising:
   a light source configured to emit a continuous wave of light frequency-modulated to arrange a measurement site of the measurement target within a correlation peak;
   a divider configured to divide the continuous wave of light into first and second divided-waves of light;
   a light receiver configured to receive interfering light of the first divided-wave of light reflected by the measurement target and the second divided-wave of light; and
   a calculator configured to calculate the vibration or displacement of the measurement target using an electric signal output from the light receiver,
   wherein
   the light source has a modulation period set to arrange the measurement site of the measurement target within the correlation peak, and
   the modulation period of the light source is set to an integral multiple of a value obtained by dividing a difference between a first length of a first optical path and a second length of a second optical path by a light speed or is set to a value close to the integral multiple,
   the first optical path leads the first divided-wave of light divided by the divider to the measurement target and leads the first divided-wave of light reflected by the measurement target to the light receiver, and the second optical path leads the second divided-wave of light divided by the divider to the light receiver.

2. The measuring apparatus according to claim 1, wherein the light source has a modulation amplitude set to arrange the measurement site of the measurement target within the correlation peak.

3. The measuring apparatus according to claim 2, wherein the modulation period and the modulation amplitude of the light source are set to arrange the measurement site of the measurement target at a former or a latter of the correlation peak.

4. The measuring apparatus according to claim 3, wherein the modulation amplitude of the light source is set in accordance with a size of the vibration or displacement of the measurement site of the measurement target.

5. The measuring apparatus according to claim 1, further comprising:
an optical fiber configured to lead the first divided-wave of light divided by the divider to an irradiation position for emitting the first divided-wave of light to the measurement target.

6. The measuring apparatus according to claim 5, further comprising:
a lens arranged between the irradiation position and the measurement target, the lens being configured to focus the first divided-wave of light emitted from the optical fiber on the measurement site of the measurement target.

7. The measuring apparatus according to claim 5, further comprising:
a lens arranged between the irradiation position and the measurement target, the lens being configured to collimate the first divided-wave of light emitted from the optical fiber and to irradiate the measurement site of the measurement target with the collimated light.

8. The measuring apparatus according to claim 1, further comprising:
a controller configured to control the light source while referring calculation results of the calculator.

9. The measuring apparatus according to claim 1, wherein the correlation peak appears when an optical path difference between the first divided-wave of light and the second divided-wave of light is equal to zero or a value obtained by dividing the optical path difference by a light speed is an integral multiple of the modulation period of the continuous wave of light.

10. A method for contactlessly measuring vibration or displacement of a measurement target comprising:
emitting a continuous wave of light frequency-modulated to arrange a measurement site of the measurement target within a correlation peak;
dividing the continuous wave of light into first and second divided-waves of light;
receiving interfering light of the first divided-wave of light reflected by the measurement target and the second divided-wave of light to generate an electric signal; and
calculating the vibration or displacement of the measurement target using the electric signal,
wherein
a modulation period is set to arrange the measurement site of the measurement target within the correlation peak, and
the modulation period is set to an integral multiple of a value obtained by dividing a difference between a first length of a first optical path and a second length of a second optical path by a light speed or is set to a value close to the integral multiple, the first optical path leads the first divided-wave of light to the measurement target and leads the first divided-wave of light reflected by the measurement target to a light receiving position, and the second optical path leads the second divided-wave of light to the light receiving position.

11. The method according to claim 10, further comprising, before emitting the continuous wave of light:
irradiating a reflection mirror arranged at a reference position in an optical path of the first divided-wave of light and calculating a modulation frequency of the continuous wave of light to maximize the electric signal;
irradiating the measurement target with the first divided-wave of light under a condition in which the reflection mirror is removed from the reference position and measuring intensity of the electric signal while changing the modulation frequency of the continuous wave of light; and
determining the modulation frequency of the continuous wave of light to arrange the measurement site of the measurement target within the correlation peak.

12. The method according to claim 10, wherein
a modulation amplitude is set to arrange the measurement site of the measurement target within the correlation peak.

13. The method according to claim 12, wherein
the modulation period and the modulation amplitude are set to arrange the measurement site of the measurement target at a former or a latter of the correlation peak.

14. The method according to claim 13, wherein
the modulation amplitude is set in accordance with a size of the vibration or displacement of the measurement site of the measurement target.

15. The method according to claim 10, wherein
the first divided-wave of light is led to an irradiation position for emitting the first divided-wave of light to the measurement target by an optical fiber.

16. The method according to claim 15, wherein
the first divided-wave of light emitted from the optical fiber is focused on the measurement site of the measurement target by a lens arranged between the irradiation position and the measurement target.

17. The method according to claim 15, wherein
the first divided-wave of light emitted from the optical fiber is collimated by a lens arranged between the irradiation position and the measurement target and the measurement site of the measurement target is irradiated with the collimated light.

18. The method according to claim 10, wherein
the correlation peak appears when an optical path difference between the first divided-wave of light and the second divided-wave of light is equal to zero or a value obtained by dividing the optical path difference by a light speed is an integral multiple of the modulation period of the continuous wave of light.

* * * * *